(No Model.) 3 Sheets—Sheet 1.
C. J. JACOBSON & J. H. STEIN.
TOOL HOLDER FOR GRINDING TOOLS.
No. 470,196. Patented Mar. 8, 1892.
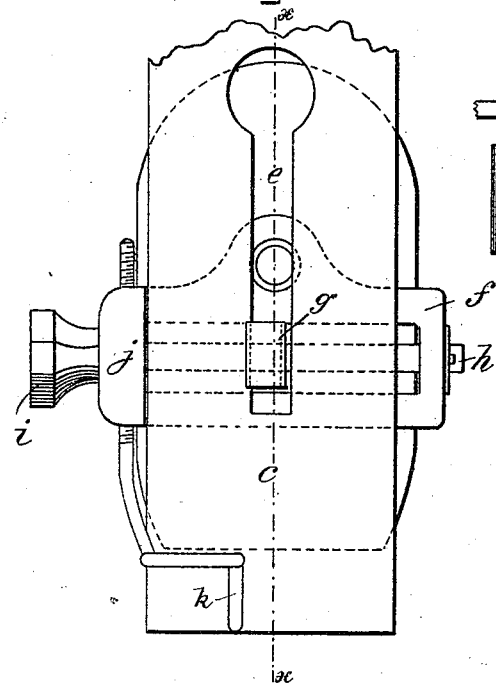
Fig. 1.
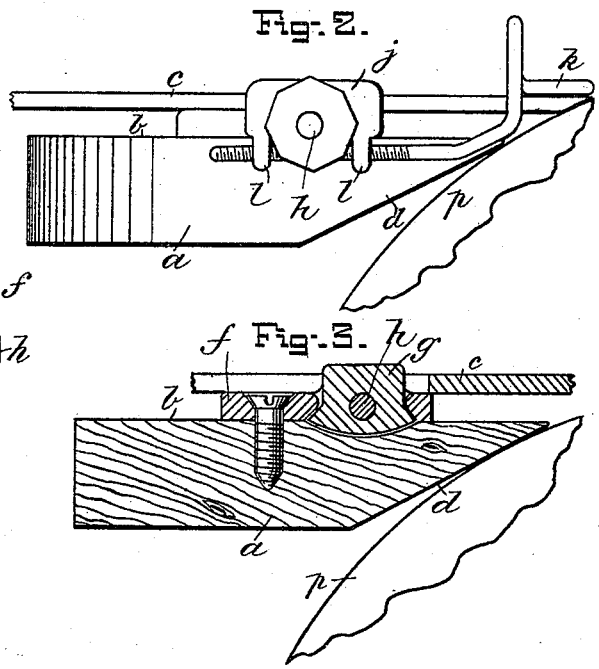
Fig. 2.
Fig. 3.
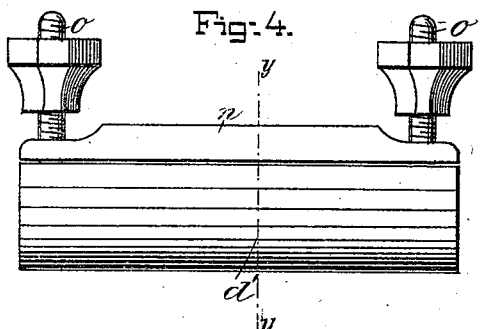
Fig. 4.
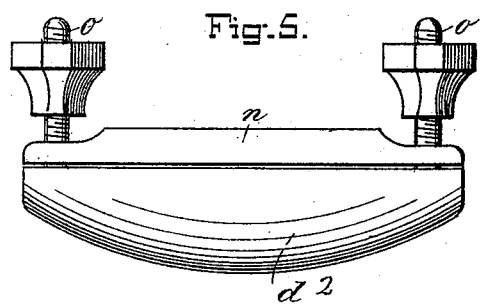
Fig. 5.
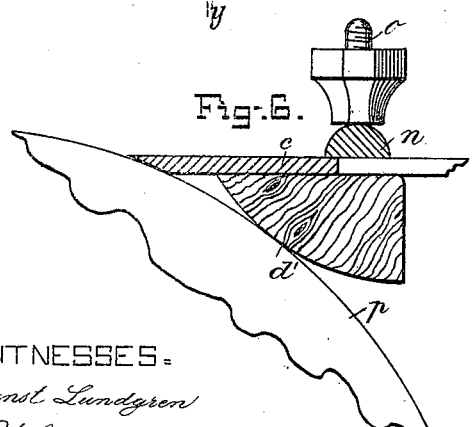
Fig. 6.
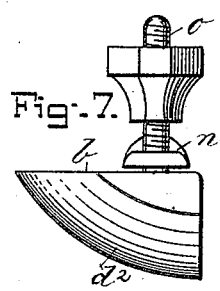
Fig. 7.
WITNESSES:
Ernst Lundgren
W. J. Morgan
INVENTORS:
Carl J. Jacobson
Jn? H. Stein.
By A. P. Thayer
Atty (No Model.) 3 Sheets—Sheet 2.

C. J. JACOBSON & J. H. STEIN.
TOOL HOLDER FOR GRINDING TOOLS.

No. 470,196. Patented Mar. 8, 1892.

WITNESSES:
Ernst Lundgren
O. J. Morgan

INVENTORS:
Carl J. Jacobson
Jos. H. Stein
By A. P. Thayer
atty (No Model.) 3 Sheets—Sheet 3.

C. J. JACOBSON & J. H. STEIN.
TOOL HOLDER FOR GRINDING TOOLS.

No. 470,196. Patented Mar. 8, 1892.

WITNESSES.
Ernst Lundgren
H. J. Morgan

INVENTORS:
Carl J. Jacobson
J. H. Stein
By A. P. Thayer
atty

UNITED STATES PATENT OFFICE.

CARL J. JACOBSON, OF BROOKLYN, AND JOSEPH H. STEIN, OF NEW YORK, N. Y.

TOOL-HOLDER FOR GRINDING TOOLS.

SPECIFICATION forming part of Letters Patent No. 470,196, dated March 8, 1892.

Application filed February 14, 1890. Serial No. 340,403. (No model.)

*To all whom it may concern:*

Be it known that we, CARL JULIUS JACOBSON, a citizen of Norway, and a resident of Brookyn, Kings county, New York, and JOSEPH H. STEIN, a citizen of the United States, and a resident of the city, county, and State of New York, have invented new and useful Improvements in Tool-Holders for Grinding Tools, of which the following is a specification.

Our invention consists of a gaging and holding block and clamping attachment of novel contrivance adapted for holding wood-plane bits, chisels, gouges, and the like by hand, for applying them to the grindstone or oil-stone, and gaging them for grinding the edges true, all as hereinafter fully described, reference being made to the accompanying drawings, in which—

Figure 8:
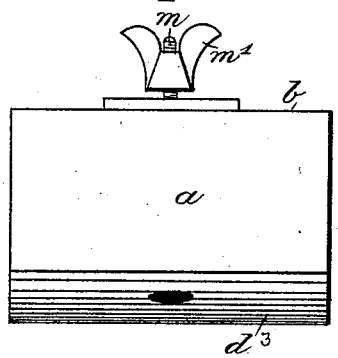
Figure 9:
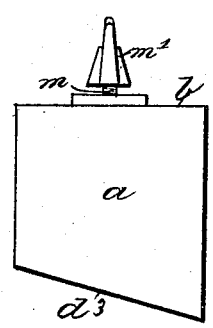
Figure 10:
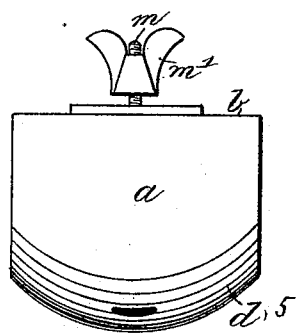
Figure 11:
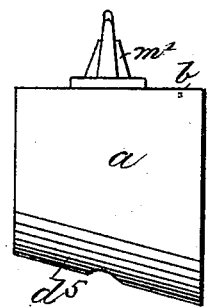
Figure 12:
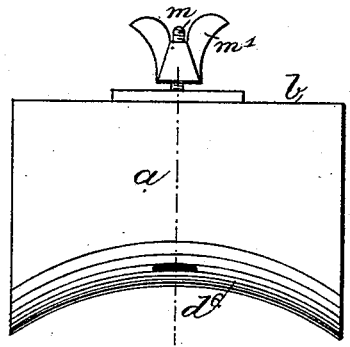
Figure 13:
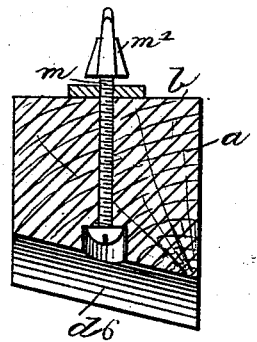
Figure 14:
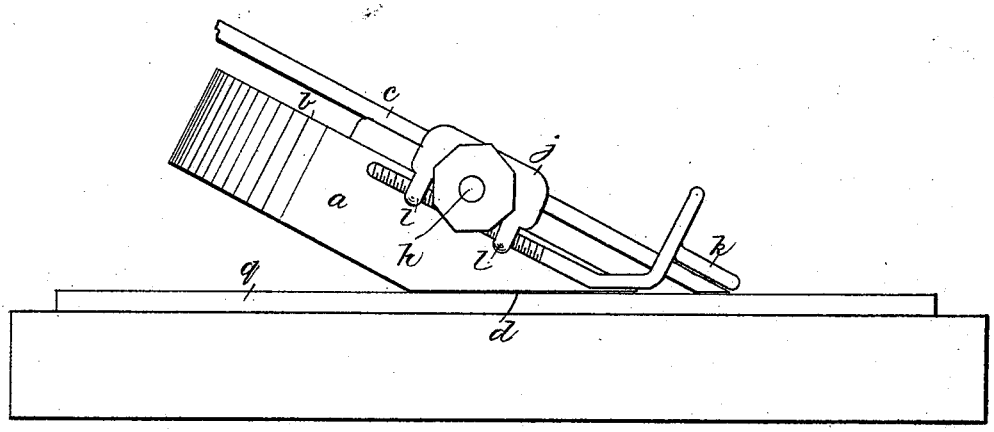
Figure 16:
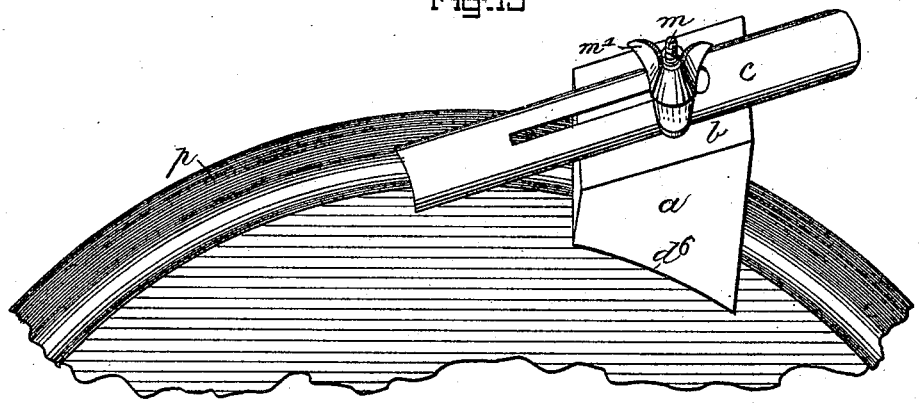

Figure 1 is a plan view of our improved gaging-holder with a plane-bit attached, as for sharpening it on the grindstone or oil-stone. Fig. 2 is a side elevation of the same and part of a grindstone. Fig. 3 is a longitudinal section on line $x\,x$ of Fig. 1 through the holder and applied to a grindstone. Figs. 4 and 5 are front elevations of the device in modified forms. Fig. 6 is a cross-section, and Fig. 7 is a side elevation, of Figs. 4 and 5, respectively. Fig. 8 is a front elevation of the gage-block in substantially the same form as in Figs. 1, 2, and 3, with a modified form of clamping device adapted for plane-bits having the usual longitudinal slot along the middle a portion of their length. Fig. 9 is a side elevation of the block and clamp as in Fig. 8. Fig. 10 is a front elevation, same as in Fig. 8, with the bevel gaging side of the block in convex transverse form, as for grinding gouge-plane bits on the convex side. Fig. 11 is a side elevation of the block and clamp as in Fig. 10. Fig. 12 is a front elevation, same as in Fig. 8, with the bevel gaging side of the block in concave transverse form, as for grinding gouge-plane bits on the concave side. Fig. 13 is a central sectional elevation of the block as in Fig. 12, the section being taken as indicated by the dotted line in that figure, and it shows the angular gaging side of the block formed transversely to the grain of the wood. Fig. 14 is a side elevation of our improved holder, showing the application to an oil-stone. Fig. 15 shows the application of the holder of Figs. 12 and 13 for grinding gouges on the corner of a grindstone.

The essential features of the invention consist of a block $a$, preferably of wood, having one flat side $b$ and another side in angular relation thereto for gaging the tool to the stone, as either the flat bevel side $d$, Figs. 1, 2, and 3, and $d^3$, Figs. 8 and 9, the lengthwise convexly-curved side $d'$, Figs 4 and 6, the lengthwise and transverse convexly-curved side $d^2$, Figs. 5 and 7, the lengthwise bevel and transverse convex side, as in Figs. 10 and 11, or the lengthwise bevel and transverse concave side, as in Figs. 12, 13, and 15, according to the form of the tool to be ground, together with a clamping device to fasten the tool to the holder.

For plane-bits $c$, having the slot $e$, we employ the metallic base-plate $f$, attached to the side $b$, for the plane-bit to rest on and having the laterally-shifting clamping-stud $g$ in a slide-way of the plate and provided with an adjusting and binding screw $h$ and a thumb-bit $i$ or other means of turning it to clamp the plane-bit between the stud inserted in the slot of the plane-bit and the shoulder $j$ of the base-plate. The stud $g$ is a little wider in the head or outer extremity than in the shank below, as indicated in Fig. 1 by the dotted lines, to confine the plane-bit on the base-plate by the edge of the head hooking over the edge of the plane-bit. The plane-bit is adjusted lengthwise of the holding-block, so that the bevel side of cutting-edge bears the proper relation to the gaging of the gage-block for bearing on the grindstone or oil-stone at the proper angle when the said gaging touches the face of the stone slightly. The gage $k$ is provided for determining the point to which the edge of the tool is to be set for this relation, said gage consisting of a wire having a screw-threaded shank working in screw-tapped holes in the studs $l$, extending down the side of block $a$ from the overhanging shoulder-piece $j$ of the base-plate and being suitably bent near the other extremity to swing over and lie on the upper surface of the plane-bit, as shown.

For plane-bits having the slot we may use a stud-bolt $m$, projecting upward from the middle of the side $b$ and having a thumb-nut $m'$ for screwing down on the plane-bit, placed on the block so that the stud-bolt projects up through the slot $e$, as represented in Fig. 15 and as the block shown in Figs. 8 to 13, inclusive.

For chisels and plane-bits not having the slot we will employ the clamping-bar $n$, with a binding screw and nut $o$ at each end, as in Figs. 4, 5, 6, and 7, with which the tool is to be inserted between the clamping-bar and side $b$ of the block, with the edge projecting beyond the beveled or curved gaging side to the proper extent and be clamped fast when properly set. We employ the gage-block having the gaging side curved, as $d'$ in Figs. 4 and 6, for tools having the straight edge, but differing as to the bevel, and for some tools we make the same in the convex transverse curve, also, as in Figs. 5 and 7. For tools having the edge curved or rounded, as gouges are usually shaped, we make the transverse convex form of said gaging side as in Figs. 10 and 11, and for such tools we rock the holder to and fro sidewise in use. For gouges beveled inside of the groove we make said side concave, as in Figs. 12 and 13, to be used on the corner of the grindstone, as in Fig. 15, for grinding such edges on said corner, the tool being shifted forward and backward sidewise relatively thereto.

The gage-block is to be held as lightly as is practicable to the touch of the stone to avoid grinding it away, the gaging side being formed transversely to the grain of the wood, as shown in Fig. 13, so that the grain is presented endwise in the gaging side to the stone, in which arrangement it is very refractory and affords a very lasting and satisfactory gage and is inexpensive for renewal.

We are aware of the supporting-plate pivoted on the grindstone-frame in front of the stone and having a tool-holder adjustable to and from the stone, which plate has a narrow bevel upper edge having no function whatever and being in such limited breadth as would not serve the purposes of the gaging side of our block, which, it is to be understood, must have a due extent of breadth and bearing-surface to serve our purpose, and, besides, it must be adapted to be held in the hands.

We claim—

1. In a hand tool-holder for grinding-tools, a block adapted to be held in the hands of the operator and provided with a clamp to fasten the tools on one side and having a gaging side in the relative angular arrangement to the tool-holding side adapted to be set in the line of the bevel side of the tool and gage the tools by the face of the stone, substantially as described.

2. In a hand tool-holder for grinding-tools, a block adapted to be held in the hands of the operator and provided with a clamp to fasten the tools on one side and having a gaging side in the relative angular arrangement to the tool-holding side adapted to be set in the line of the bevel side of the tool and gage the tools by the face of the stone, said gaging side formed transversely to the grain of the wood, substantially as described.

3. The improved gaging-tool holder consisting of the wood-gage block having a clamp adapted to fasten the tool to one side thereof adjustably lengthwise and also having the angular reverse side adapted to be set in the line of the bevel side of the edge of the tool, or approximately so, said angular side being curved transversely, substantially as described.

4. The improved gaging-tool holder consisting of the wood-gage block having a clamp adapted to fasten the tool to one side thereof adjustably lengthwise, and also having the angular reverse side adapted to be set in the line of the bevel side of the edge of the tool, or approximately so, said angular side being curved transversely in concave form, substantially as described.

5. The improved gaging-tool holder consisting of the gage-block having a clamp adapted to fasten the tool to one side adjustably lengthwise, also having the angular reverse side adapted to be set in the line of the bevel side of the edge of the tool, or approximately so, and also having the adjustable tool-setting gage, substantially as described.

6. The combination, with the grinding-gage tool-holding block having the angularly-arranged tool holding and gaging sides, of the clamp consisting of the base-plate placed transversely to the block and having the shoulder at one end adapted for engaging one edge of the tool, the adjusting-screw, and the adjustable clamping-stud adapted for engaging the other edge of the tool, substantially as described.

In testimony that we claim the foregoing as our invention we have signed our names, in presence of two witnesses, this 12th day of February, 1890.

CARL J. JACOBSON.
JOSEPH H. STEIN.

Witnesses:
W. J. MORGAN,
W. B. EARLL.